(12) United States Patent
Fujiwara et al.

(10) Patent No.: US 9,259,866 B2
(45) Date of Patent: Feb. 16, 2016

(54) LENS FORMING APPARATUS

(71) Applicant: FUJIFILM Corporation, Tokyo (JP)

(72) Inventors: Takayuki Fujiwara, Saitama (JP); Seiichi Watanabe, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/483,374

(22) Filed: Sep. 11, 2014

(65) Prior Publication Data

US 2015/0050378 A1    Feb. 19, 2015

Related U.S. Application Data

(63) Continuation of application No. PCT/JP2013/054966, filed on Feb. 26, 2013.

(30) Foreign Application Priority Data

Mar. 12, 2012  (JP) .................................. 2012-054504

(51) Int. Cl.
*B29C 43/38* (2006.01)
*B29C 43/58* (2006.01)
(Continued)

(52) U.S. Cl.
CPC ............... *B29C 43/58* (2013.01); *B29C 43/021* (2013.01); *B29C 43/36* (2013.01); *B29C 43/52* (2013.01); *C03B 11/08* (2013.01); *C03B 11/122* (2013.01);
(Continued)

(58) Field of Classification Search
CPC .. B29C 43/5852; B29C 43/021; B29C 43/36; B29C 2043/5816; B29C 2043/522; B29C 2043/3628; B29K 2909/02; B29K 2909/5816; B29K 2995/0013

USPC .............. 425/174, 174.8, 352–355, 407–412; 65/305, 307, 315, 323, 352
See application file for complete search history.

(56) References Cited

U.S. PATENT DOCUMENTS 5,422,046 A * 6/1995 Tarshiani et al. .......... 425/174.4
6,813,906 B1 * 11/2004 Hirota et al. ............... 425/352
2010/0104855 A1    4/2010 Yoshioka et al.

FOREIGN PATENT DOCUMENTS

JP        08-132541       5/1996
JP        2004-351740     12/2004
(Continued)

OTHER PUBLICATIONS

International Search Report/ PCT/JP2013/054966, Jun. 4, 2013.
(Continued)

*Primary Examiner* — Joseph S Del Sole
*Assistant Examiner* — Thukhanh T Nguyen
(74) *Attorney, Agent, or Firm* — Young & Thompson (57) ABSTRACT

The invention provides a lens forming apparatus that can suppress generation of burrs even if gaps between outer walls of an upper die and a lower die and an inner wall of a trunk die is made wide. A lens forming apparatus 11 according to the present invention includes a trunk die 12 having a through-hole 17 therein; first and second dies 13 and 14 that are fitted into the through-hole 17 from both ends thereof, respectively, and have pressing surfaces 20 and 30 for sandwiching and pressing a forming material 24; and induction-heating coils 15 and 16 that heat the first and second dies 13 and 14 to a temperature equal to or higher than a glass transition point, in a state where the trunk die 12 is not heated and the temperature thereof is set to a temperature equal to or lower than the glass transition point.

7 Claims, 5 Drawing Sheets

(51) Int. Cl.
  *B29C 43/36* (2006.01)
  *B29C 43/02* (2006.01)
  *B29C 43/52* (2006.01)
  *C03B 11/08* (2006.01)
  *C03B 11/12* (2006.01)
  *B29L 11/00* (2006.01)

(52) U.S. Cl.
  CPC ... *B29C 2043/3628* (2013.01); *B29C 2043/522* (2013.01); *B29C 2043/5816* (2013.01); *B29K 2909/02* (2013.01); *B29K 2995/0013* (2013.01); *B29L 2011/0016* (2013.01); *C03B 2215/03* (2013.01); *C03B 2215/06* (2013.01); *C03B 2215/07* (2013.01); *C03B 2215/72* (2013.01)

(56) References Cited

FOREIGN PATENT DOCUMENTS

| | | |
|---|---|---|
| JP | 2006-256078 | 9/2006 |
| JP | 2008-273194 | 11/2008 |
| JP | 2009-234883 | 10/2009 |
| JP | 2011-167988 | 9/2011 |

OTHER PUBLICATIONS

Written Opinion, PCT/JP2013/054966, Jun. 4, 2013.
Chinese Office Action dated Oct. 10, 2015, with English Translation; Application No. 2013180007944.5.

* cited by examiner

LENS FORMING APPARATUS

CROSS-REFERENCE TO RELATED APPLICATIONS

This application is a Continuation of PCT International Application No. PCT/JP2013/054966 filed on February 26, 2013, which claims priority under 35 U.S.C §119(a) to Japanese Patent Application No. 2012-054504 filed on Mar. 12, 2012. Each of the above applications is hereby expressly incorporated by reference, in its entirety, into the present application.

BACKGROUND OF THE INVENTION

1. Field of the Invention

The present invention relates to a lens forming apparatus that presses a material made of glass or resin to form a lens.

2. Description of the Related Art

As methods for manufacturing lenses, a lens manufacturing method using press working and additionally a lens manufacturing method using polishing are known. In the lens manufacturing method using the press working, a material made of glass or resin softened by heating the material made of glass or resin received within a forming die together with the forming die is pressed to form a lens. As a forming die to be used for the press working, there is known a forming die constituted by a trunk die having a through-hole formed therein, a lower die that is fitted into the through-hole from a lower end thereof and allows a material made of glass or resin to be placed thereon, and an upper die that is fitted into the through-hole from an upper end thereof and sandwiches and presses the material made of glass or resin between the upper die and the lower die.

Since the lower die and the upper die move inside the through-hole of the trunk die while at least portions of respective outer walls thereof come into contact with an inner wall of the trunk die, the outer walls of the lower die and the upper die and the inner wall of the trunk die rub each other whereby the forming die is damaged and the lifespan of the forming die becomes short. For this reason, it is preferable to make gaps between the outer walls of the lower die and the upper die and the inner wall of the trunk die wider so that the rubbing between the respective outer walls of the upper die and the lower die and the inner wall of the trunk die does not occur. However, if the gaps are wide, the lower die and the upper die deviate in a lateral direction with respect to a central axis of the through-hole in the vertical direction and move inside the through-hole and the material made of glass or resin is pressed. Thus, an eccentric lens is formed. Additionally, the pressed material made of glass or resin elongates in the direction of the trunk die and flows into the gaps, and thus, burrs are generated.

For example, a lens forming apparatus in which a lower die and an upper die move inside a through-hole of a trunk die while at least portions of respective outer walls thereof come into contact with an inner wall of the trunk die is described in JP2008-273194A. During press forming, a lens is press-formed in a state where all temperatures of the upper die, the lower die, and the trunk die are set to temperatures equal to or higher than a glass transition point.

Additionally, a lens forming apparatus in which a lower die and an upper die move inside a through-hole of a trunk die while at least portions of respective outer walls thereof come into contact with an inner wall of the trunk die is also described in JP2004-351740A. However, during the press forming, a lens is press-formed in a state where one or both of the upper die and the lower die are heated and thereby thermally expand, the trunk die is not heated but is kept from thermally expanding, and the coefficients of linear expansion of the upper die and the lower die are greater than the coefficient of linear expansion of the trunk die. For this reason, during the press forming, gaps between outer walls of the lower die and the upper die and an inner wall of the trunk die can be narrowed.

SUMMARY OF THE INVENTION

However, the lens forming apparatus in JP2008-273194A and JP2004-351740A have a problem in that, since the lower die and the upper die move inside the through-hole of the trunk die while at least portions of the respective outer walls thereof come into contact with the inner wall of the trunk die, the outer walls of the lower and upper dies and the inner wall of the trunk die rub each other whereby the forming die is damaged and the lifespan of the forming die becomes short.

The invention has been made in view of the aforementioned problems, and an object thereof is to provide a lens forming apparatus that can suppress generation of burrs even if gaps between outer walls of an upper die and a lower die and an inner wall of a trunk die are made wide such that the rubbing between the outer walls of the upper die and the lower die and the inner wall of the trunk die does not occur.

In order to achieve the aforementioned object, a lens forming apparatus of the invention includes a trunk die having a through-hole; first and second dies that are fitted into the through-hole from both ends thereof, respectively, and has pressing surfaces for sandwiching and pressing a forming material formed on mutually facing surfaces, that is, opposed surfaces thereof; and a heating control unit that is controlled to heat the first and second dies to a temperature equal to or higher than a glass transition point, in a state where the trunk die is not heated and the temperature thereof is set to a temperature equal to or lower than the glass transition point.

Additionally, it is preferable that the heating control unit control induction heating, the first and second dies be made of a material that is induction-heated, and the trunk die be a dielectric body made of a material that is not induction-heated.

Additionally, it is preferable that a member whose thermal conductivity is lower than those of the first die, the second die, and the trunk die be provided between outer walls of the first and second dies and an inner wall of the trunk die. At this time, it is preferable that the thermal conductivity of the member whose thermal conductivity is lower than those of the first die, the second die, and the trunk die be within a range of 0.01 to 10.00 w/mk.

Additionally, it is preferable that the first and second dies be heated and thermally expand, and the trunk die is not heated but be kept from thermally expanding, whereby gaps between the outer walls of the first and second dies and the inner wall of the trunk die become small during compression forming.

Additionally, it is preferable that the coefficients of linear expansion of the first and second dies be greater than the coefficient of linear expansion of the trunk die. Moreover, it is preferable that the heating control unit be capable of uniformly controlling the temperature of the trunk die.

According to the lens forming apparatus of the invention, it is possible to suppress generation of burrs even if the gaps between the outer walls of the upper die and the lower die and the inner wall of the trunk die are made wide such that the rubbing between the outer walls of the upper die and the lower die and the inner wall of the trunk die does not occur.

DESCRIPTION OF THE PREFERRED EMBODIMENTS

Preferred embodiments of the invention will be described below in detail referring to the attached drawings.

Figure 1:
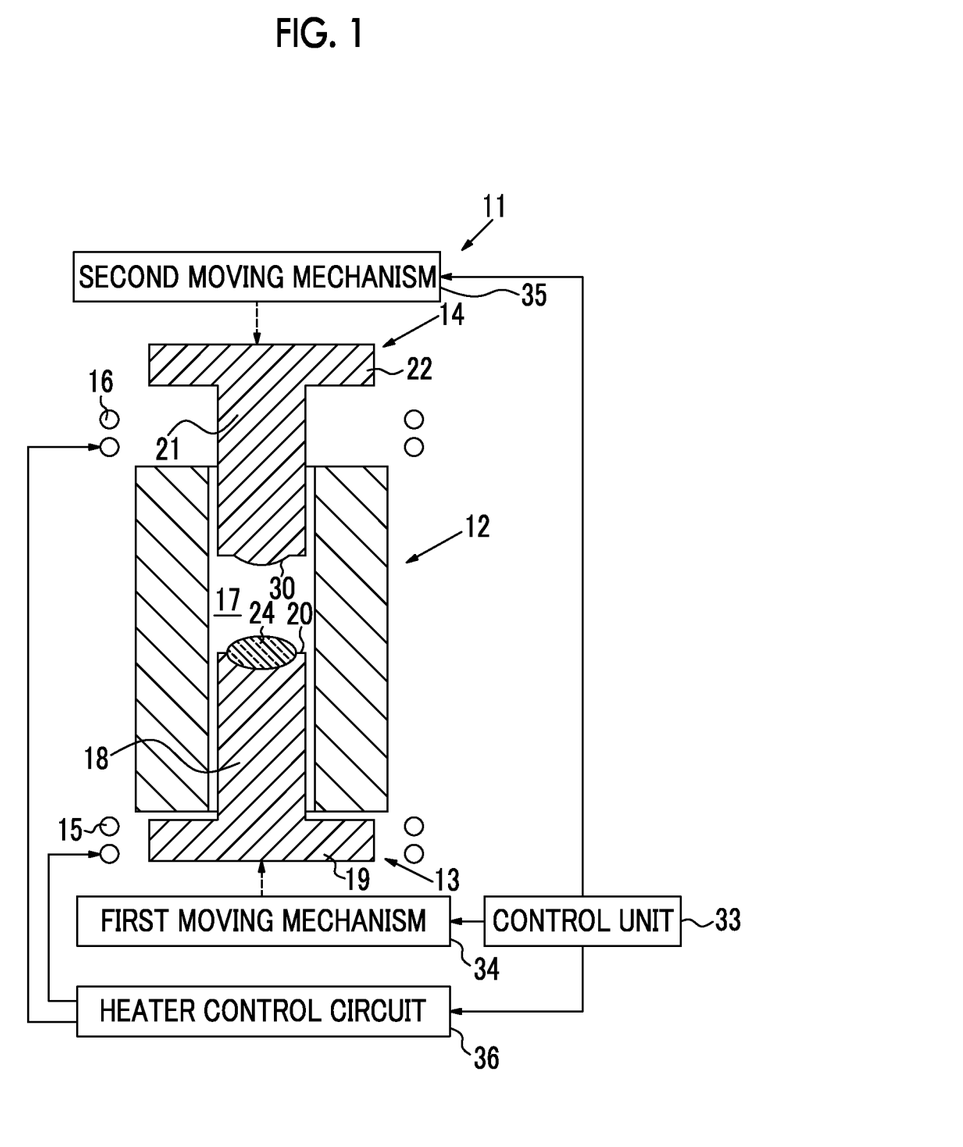
FIG. 1 is a cross-sectional view of a lens forming apparatus.

A lens forming apparatus 11 related to a first embodiment of the invention is shown in FIG. 1. The lens forming apparatus 11 is mainly constituted by a trunk die 12, a lower die 13, an upper die 14, and induction-heating coils 15 and 16.

Figure 2A:
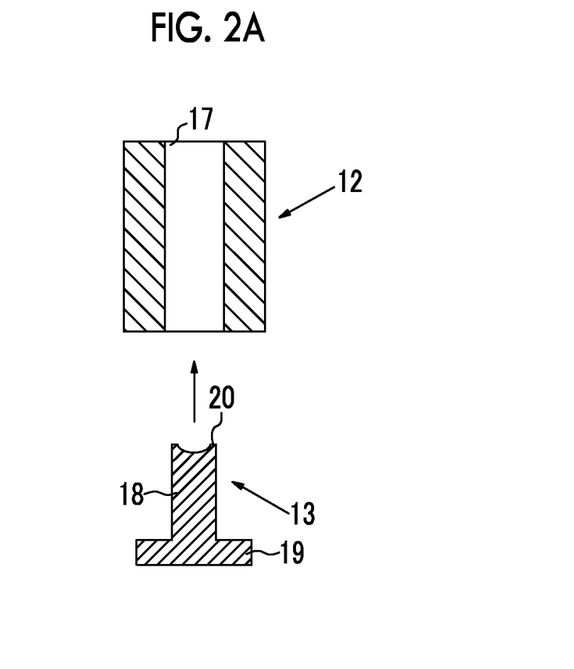
FIGS. 2(A) and 2(B) are cross-sectional views of a lens forming die showing an assembling process.

The trunk die 12 is a dielectric body made of a material, such as ceramic, which is not induction-heated, and is formed with a columnar through-hole 17 that penetrates in a vertical direction. The lower die 13 is made of a material having high electrical conductivity, such as SUS or carbide, which is induction-heated, and is constituted by a die body 18 and a supporting portion 19. The die body 18 has a column shape whose external diameter is smaller than the diameter of the through-hole 17, and has a lens forming surface (pressing surface) 20 formed at a tip thereof. Since the external diameter of the die body 18 is smaller than the diameter of the through-hole 17, when the lower die 13 is moved within the trunk die 12, a certain degree of gap can be maintained between an outer wall of the lower die 13 and an inner wall of the trunk die 12. The supporting portion 19 has a disk shape whose external diameter is greater than the external diameter of the die body 18, and is formed integrally with the die body 18. As shown in FIG. 2(A), the lower die 13 is fitted from a lower end of the through-hole 17 with the lens forming surface 20 being directed upward. Here, the supporting portion 19 does not enter the through-hole 17.

The upper die 14, similar to the lower die 13, is made of a material having high electrical conductivity, such as SUS or carbide, which is induction-heated, and is constituted by a die body 21 and a supporting portion 22. The die body 21 has a column shape whose external diameter is smaller than the diameter of the through-hole 17, and has a lens forming surface (pressing surface) 30 formed at a tip thereof. Since the external diameter of the die body 21 is smaller than the diameter of the through-hole 17, when the upper die 14 is moved within the trunk die 12, a certain degree of gap can be maintained between an outer wall of the upper die 14 and the inner wall of the trunk die 12. The supporting portion 22 has a disk shape whose external diameter is greater than the external diameter of the die body 21, and is formed integrally with the die body 21.

Figure 2B:
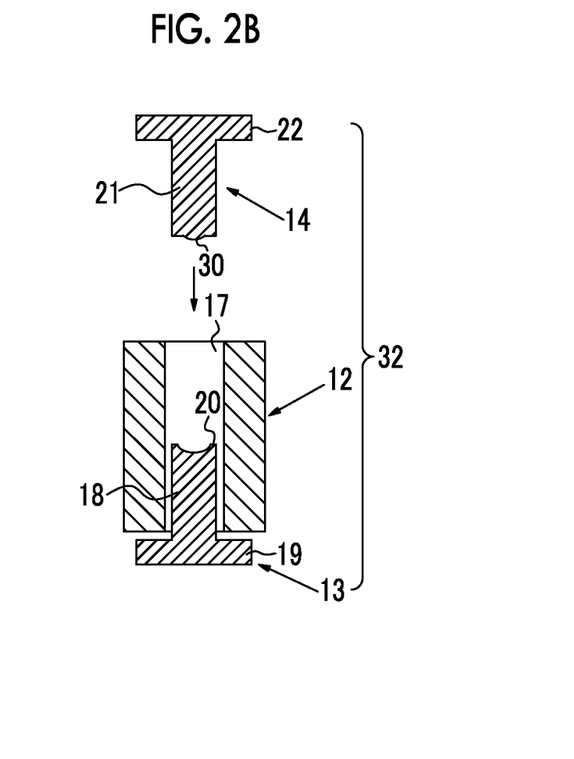

As shown in FIG. 2(B), the upper die 14 is fitted from an upper end of the through-hole 17 with the lens forming surface 30 being directed downward. Here, the supporting portion 22 does not enter the through-hole 17. A cavity (gap) is formed between the lens forming surface 20 of the lower die 13 and the lens forming surface 30 of the upper die 14 within the through-hole 17 by the fitting of the upper die 14.

The coefficients of linear expansion of the upper die 13 and the lower die 14 are greater than the coefficient of linear expansion of the trunk die 12. Additionally, the heat capacity of the lens forming die 32 is suppressed to be low so that the temperature up time and cooling time when the lens forming die 32 is heated and cooled are shortened.

A control unit 33 shown in FIG. 1 controls the operation of respective parts of the lens forming apparatus 11. That is, the control unit 33 sends signals for appropriately operating a first moving mechanism 34, a second moving mechanism 35, and a heater control circuit 36, respectively. The first moving mechanism 34 is connected to the lower die 13 and receives a signal from the control unit 33 to move the lower die 13. The second moving mechanism 35 is connected to the upper die 14 and receives a signal from the control unit 33 to move the upper die 14. Here, a control is made so as to make the central axes of the upper die 13 and the lower die 14 in the vertical direction coincide with the central axis of the through-hole 17 in the vertical direction and so as to move the upper die 13 and the lower die 14 in the vertical direction within the through-hole 17. The heater control circuit 36 receives a signal from the control unit 33, and sends signals for heating the upper die 13 and the lower die 14 to the induction-heating coils 15 and 16.

Figure 3A:
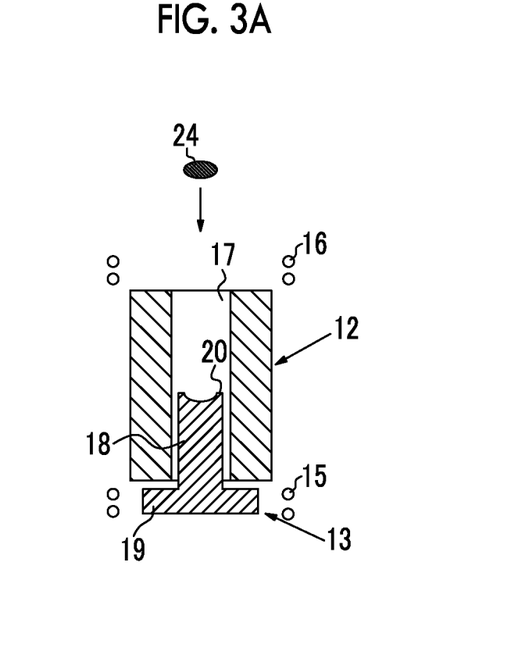
FIGS. 3(A) and 3(B) are cross-sectional views of a lens forming apparatus illustrating a lens forming process.

As shown in FIG. 3(A), the lower die 13 is fitted from the lower end of the through-hole 17 by the first moving mechanism 34 with the lens forming surface 20 being directed upward. A lens material 24 having, for example, an elliptical cross-section is placed on the lens forming surface 20 of the lower die 13 fitted from the lower end of the through-hole 17. In addition, the raw material of the lens material 24 includes glass, resin, or the like.

Figure 3B:
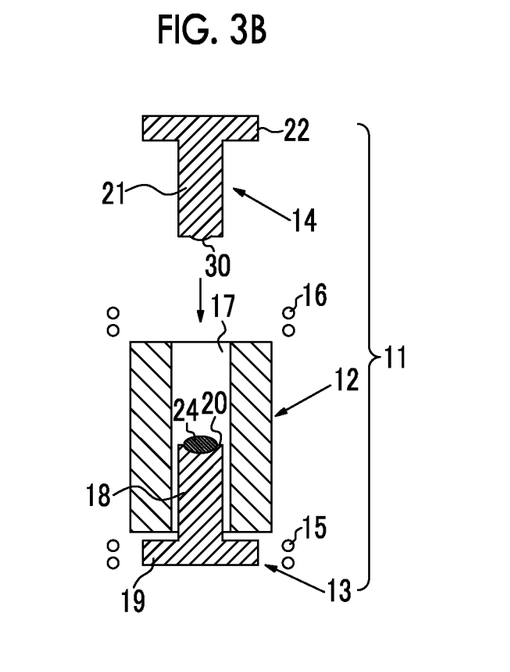

Next, as shown in FIG. 3(B), the upper die 14 is fitted from the upper end of the through-hole 17 by the second moving mechanism 35 with the lens forming surface 30 being directed downward. The upper die 14 is fitted from the upper end of the through-hole 17, and the lens material 24 is heated together with the upper die 13 and the lower die 14 by the heater control circuit 36. The heating of the upper die 13 and the lower die 14 is performed by high-frequency induction heating. Since the upper die 13 and the lower die 14 that are fitted into the through-hole 17 are respectively surrounded by the induction-heating coils 15 and 16, the high-frequency induction heating using the heater control circuit 36 and the induction-heating coils 15 and 16 can be performed to heat the upper die 13 and the lower die 14. Since the upper die 13 and the lower die 14 are made of a material that is induction-heated and has high electrical conductivity, and the trunk die 12 is made of a material that is not induction-heated, only the upper die 13 and the lower die 14 are heated to a temperature equal to or higher than a glass transition point in a state where the trunk die 12 is not heated and the temperature of the trunk die 12 is a temperature equal to or lower than Tg (glass transition point). Here, the temperature of the trunk die 12 is uniform. The lens material 24 heated and softened by the upper die 13 and the lower die 14 being heated is pressed while being sandwiched by the lens forming surfaces 20 and 30 of the upper die 13 and the lower die 14, and is formed as a lens.

The upper die 13 and the lower die 14 are heated and therefore thermally expand. On the other hand, since the trunk die 12 is not heated, the trunk die 12 is kept from thermally expanding. However, as the upper die 13 and the lower die 14 thermally expand, the gap between the outer walls of the upper die 13 and the lower die 14 and the inner wall of the trunk die 12 becomes small. Additionally, since the coefficients of linear expansion of the upper die 13 and the lower die 14 are greater than the coefficient of linear expansion of the trunk die 12, the thermal expansion by the heating of the upper die 13 and the lower die 14 further increases. As a result, the gaps between the outer walls of the upper die 13 and the lower die 14 and the inner wall of the trunk die 12 can be made smaller. As the gaps between the outer walls of the upper die 13 and the lower die 14 and the inner wall of the trunk die 12 become small, the deviation of the upper die 13 and the lower die 14 in the horizontal direction with respect to the central axis of the through-hole 17 in a lateral direction is suppressed and the lens material 24 is pressed. Therefore, the eccentricity of a formed lens is suppressed.

The formed lens is cured by being cooled together with the upper die 13 and the lower die 14. The cooling of the upper die 13, the lower die 14, and the lens is performed by stopping the driving of the heater control circuit 36, stopping the heating of the upper die 13 and the lower die 14 by the high-frequency induction heating, and radiating heat to the air passing through the gaps between the outer walls of the upper die 13 and the lower die 14 and the inner wall of the trunk die 12. Since air is introduced into the through-hole 17 through the gaps between the outer walls of the upper die 13 and the lower die 14, and the inner wall of the trunk die 12, heat can be efficiently radiated. The cooled and cured lens can be taken out by the upper die 14 being removed from the trunk die 12 by the second moving mechanism 35.

Figure 4:
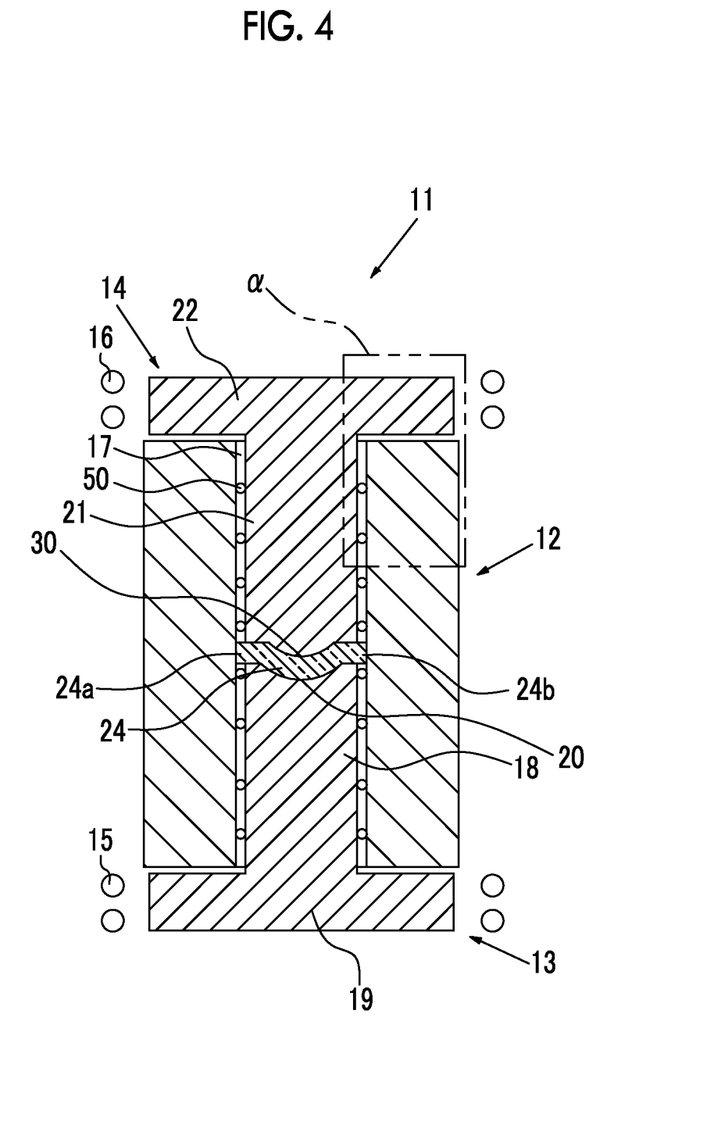
FIG. 4 is a cross-sectional view of the lens forming apparatus when a lens forming material is pressed.
Figure 5:
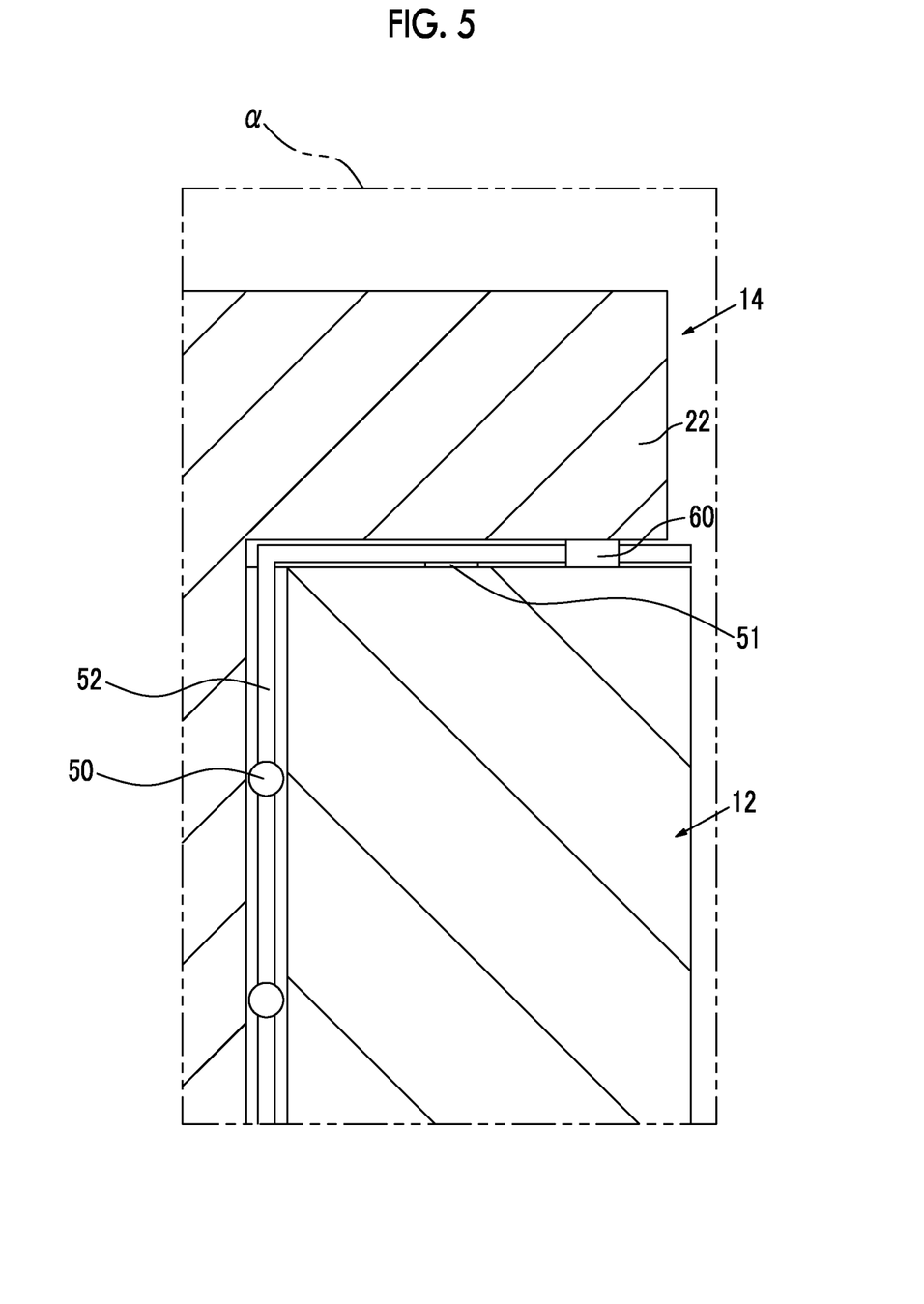
FIG. 5 is an enlarged view of a portion shown by referential mark α in FIG. 4.

A situation when a lens forming apparatus 11 related to a second embodiment of the invention presses the lens material 24 is shown in FIGS. 4 and 5. Ceramic balls 50 having lower thermally conductivity than the upper die 13, the lower die 14, and the trunk die 12 are provided between the outer walls of the upper die 13 and the lower die 14 and the inner wall of the trunk die 12. A retainer 52 fixed to a fixing member 51 fixed to the trunk die 12 is provided between the outer walls of the upper die 13 and the lower die 14 and the inner wall of the trunk die 12, and the ceramic balls 50 are fixed to the retainer 52. The ceramic balls 50 can suppress the heat conduction among the upper die 13, the lower die 14, and the trunk die 12 and can increase the differences between the temperatures of the heated upper die 13 and the lower die 14 and the temperature of the trunk die 12 that is not heated. At this time, it is preferable that the thermal conductivity of the ceramic balls 50 be within a range of 0.01 to 10.00 w/mk. This is because, if the thermal conductivity of the ceramic balls 50 is made to fall within the range of 0.01 to 10.00 w/mk, the heat conduction among the upper die 13, the lower die 14, and the trunk die 12 is sufficiently suppressed, and the differences between the temperatures of the heated upper die 13 and the lower die 14 and the temperature of the trunk die 12 that is not heated can be reliably increased.

The lens material 24 is pressed through the same lens forming process as the first embodiment. Here, a supporting member 60 for supporting the upper die 14 is fixed to the trunk die 12. The upper die 14 is fitted into the through-hole 17 by the second moving mechanism 35 to a position where the supporting portion 22 comes into contact with the supporting member 60, and the lens material 24 is pressed. As shown in FIG. 4, the pressed lens material 24 extends in the direction of the trunk die 12, and comes into contact with the trunk die 12. Since the temperature of the trunk die 12 is a temperature equal to or lower than the glass transition point, portions 24a and 24b of the lens material 24 that are heated to a temperature equal to or higher than the glass transition point and has flowed into the gaps between the outer walls of the upper die 13 and the lower die 14 and the inner wall of the trunk die 12 are instantaneously solidified by the contact with the trunk die 12. Even if the gaps between the outer walls of the upper die 13 and the lower die 14 and the inner wall of the trunk die 12 are wide such that the rubbing between the outer walls of the upper die 13 and the lower die 14 and the inner wall of the trunk die 12 does not occur, the portions 24a and 24b of the lens materials 24 come into contact with the trunk die 12 and are instantaneously solidified immediately before entering the gaps. Therefore, the portions 24a and 24b of the lens material 24 serve as shields, and the lens material 24 does not enter any more. As a result, generation of burrs can be prevented. A formed lens can be taken out by the upper die 14 being removed from the trunk die 12 by the second moving mechanism 35 through the same lens cooling process as the first embodiment.

According to the lens forming apparatus related to the present embodiments as described above, it is possible to provide a lens forming apparatus that can suppress generation of burrs even if the gaps between the outer walls of the upper die and the lower die and the inner wall of the trunk die are made wider such that the rubbing between the outer walls of the upper die and the lower die and the inner wall of the trunk die does not occur.

In addition, in the description of the above embodiments, the upper die is fitted from the upper end of the through-hole of the trunk die, and the upper die and the lower die are heated. However, the application of the invention is not limited to this case, and the upper die and the lower die may be heated immediately before the lens material is pressed.

What is claimed is:

1. A lens forming apparatus, comprising:
   a trunk die having a through-hole;
   first and second dies that are fitted into the through-hole from both ends thereof, respectively, and has pressing surfaces capable of sandwiching and pressing a forming material formed on opposed surfaces thereof;
   a heating control unit that is controlled to heat the first and second dies to a temperature equal to or higher than a glass transition point, in a state where the trunk die is not heated and a temperature of the trunk die is set to a temperature equal to or lower than the glass transition point; and
   a member located at a position between outer walls of the first and second dies and an inner wall of the trunk die, a thermal conductivity of the member being lower than that of any of the first die, the second die, and the trunk die,
   wherein the heating control unit is controls induction heating, and
   wherein the first and second dies are of a material that is induction-heated, and the trunk die is a dielectric body of a material that is not induction-heated.

2. The lens forming apparatus according to claim 1, wherein the first and second dies are heated and thermally expanded, and the trunk die is not heated but is kept from thermally expanding, whereby gaps between the outer walls of the first and second dies and the inner wall of the trunk die become small during compression forming.

3. The lens forming apparatus according to claim 2, wherein the coefficients of linear expansion of the first and second dies are greater than the coefficient of linear expansion of the trunk die.

4. The lens forming apparatus according to claim 3, wherein the heating control unit is capable of uniformly controlling the temperature of the trunk die.

5. The lens forming apparatus according to claim 1, wherein the member located at the position between the outer walls of the first and second dies and the inner wall of the trunk die is a ceramic ball, and the thermal conductivity of the ceramic ball is within a range of 0.01 to 10.00 w/mk.

6. The lens forming apparatus according to claim 1, wherein the temperature of the trunk die is set to a temperature lower than the glass transition point.

7. The lens forming apparatus according to claim 1, wherein the temperature of the trunk die is such that forming material heated to a temperature equal to or higher than the glass transition point instantaneously solidifies upon contact with the trunk die.

* * * * *